(12) United States Patent
Shipley et al.

(10) Patent No.: US 8,619,674 B1
(45) Date of Patent: Dec. 31, 2013

(54) DELIVERY OF WIRELESS ACCESS POINT INFORMATION

(75) Inventors: Trevor D. Shipley, Olathe, KS (US); Cesar Perez, Olathe, KS (US); John D. Sumler, Kansas City, MO (US)

(73) Assignee: Sprint Spectrum L.P., Overland Park, KS (US)

( * ) Notice: Subject to any disclaimer, the term of this patent is extended or adjusted under 35 U.S.C. 154(b) by 381 days.

(21) Appl. No.: 12/956,170

(22) Filed: Nov. 30, 2010

(51) Int. Cl.
*H04W 4/00* (2009.01)

(52) U.S. Cl.
USPC .......................................... 370/328

(58) Field of Classification Search
None
See application file for complete search history.

(56) References Cited

U.S. PATENT DOCUMENTS

| | | | |
|---|---|---|---|
| 6,021,328 | A | 2/2000 | Curtis et al. |
| 6,480,541 | B1 | 11/2002 | Girod et al. |
| 6,591,110 | B1 | 7/2003 | Kim et al. |
| 6,606,496 | B1 | 8/2003 | Salvarani et al. |
| 6,625,119 | B1 | 9/2003 | Schuster et al. |
| 6,839,356 | B2 | 1/2005 | Barany et al. |
| 6,980,523 | B1 | 12/2005 | Lipford et al. |
| 7,058,124 | B2 | 6/2006 | Koo |
| 7,099,283 | B2 | 8/2006 | Matta et al. |
| 7,130,311 | B2 | 10/2006 | Yavuz et al. |
| 7,142,562 | B2 | 11/2006 | Yavuz et al. |
| 7,245,915 | B2 | 7/2007 | Matta et al. |
| 7,328,027 | B1 | 2/2008 | Mangal |
| 7,411,923 | B2 | 8/2008 | Attar et al. |
| 7,411,974 | B2 | 8/2008 | Attar et al. |
| 7,426,395 | B2 | 9/2008 | Stephens |
| 7,440,431 | B2 | 10/2008 | Sindhushayana et al. |
| 7,486,645 | B2 | 2/2009 | Li et al. |
| 2003/0064741 | A1 | 4/2003 | Silva et al. |
| 2003/0117956 | A1 | 6/2003 | Lee |
| 2004/0017860 | A1 | 1/2004 | Liu |
| 2004/0057420 | A1 | 3/2004 | Curcio et al. |
| 2004/0141499 | A1 | 7/2004 | Kashima et al. |
| 2004/0196852 | A1 | 10/2004 | Aksu et al. |
| 2005/0032522 | A1 | 2/2005 | Soong et al. |
| 2005/0059396 | A1 | 3/2005 | Chuah et al. |
| 2005/0197118 | A1 | 9/2005 | Mitchell |

(Continued)

FOREIGN PATENT DOCUMENTS

| | | |
|---|---|---|
| WO | WO 2004004249 | 1/2004 |
| WO | WO 2004028095 | 4/2004 |

OTHER PUBLICATIONS

U.S. Appl. No. 12/141,569, filed Jun. 18, 2008.
U.S. Appl. No. 12/432,736, filed Apr. 29, 2009.

(Continued)

*Primary Examiner* — Phirin Sam
*Assistant Examiner* — Hai-Chang Hsiung

(57) ABSTRACT

A radio access network (RAN) includes a first wireless access point that radiates to define a first wireless coverage area, and a second wireless access point that radiates to define a second wireless coverage area. A dual-mode wireless communication device (WCD), capable of communicating via both the first and second wireless coverage areas registers with the first wireless access point. As part of the registration process, or at some point thereafter, the first wireless access point transmits information that identifies the second wireless coverage area. The first wireless access point also transmits a WCD identifier received from the WCD during the registration process to the second access point, so that the second access point can add the WCD identifier to its whitelist. Thus, via the second wireless coverage area, the WCD can register with the second wireless coverage area.

13 Claims, 8 Drawing Sheets

(56) References Cited

U.S. PATENT DOCUMENTS

| | | | |
|---|---|---|---|
| 2005/0286440 | A1 | 12/2005 | Strutt et al. |
| 2006/0077994 | A1 | 4/2006 | Spindola et al. |
| 2006/0133332 | A1 | 6/2006 | Achanta |
| 2006/0252429 | A1 | 11/2006 | Chen et al. |
| 2007/0060165 | A1 | 3/2007 | Black et al. |
| 2007/0109967 | A1 | 5/2007 | Ha |
| 2007/0117580 | A1 | 5/2007 | Fehr |
| 2008/0049706 | A1 | 2/2008 | Khandekar et al. |
| 2009/0135758 | A1* | 5/2009 | Alper et al. ............. 370/328 |
| 2009/0288139 | A1* | 11/2009 | Huber et al. ............. 726/2 |
| 2009/0316604 | A1* | 12/2009 | Singh et al. ............. 370/254 |
| 2010/0027469 | A1* | 2/2010 | Gurajala et al. ............. 370/328 |
| 2010/0122338 | A1 | 5/2010 | Kataoka et al. |
| 2010/0248640 | A1* | 9/2010 | MacNaughtan et al. ... 455/67.11 |
| 2010/0322218 | A1 | 12/2010 | Liu |
| 2011/0019639 | A1 | 1/2011 | Karaoguz et al. |
| 2011/0116480 | A1* | 5/2011 | Li et al. ............. 370/332 |
| 2011/0194530 | A1* | 8/2011 | Tinnakornsrisuphap et al. ............. 370/331 |
| 2011/0205910 | A1 | 8/2011 | Soomro et al. |
| 2011/0263242 | A1* | 10/2011 | Tinnakornsrisuphap et al. ............. 455/422.1 |

OTHER PUBLICATIONS

U.S. Appl. No. 12/350,694, filed Jan. 8, 2009.
U.S. Appl. No. 12/397,855, filed Mar. 4, 2009.
U.S. Appl. No. 12/494,999, filed Jun. 30, 2009.
U.S. Appl. No. 12/507,913, filed Jul. 23, 2009.
U.S. Appl. No. 11/746,229, filed May 29, 2007.
U.S. Appl. No. 12/478,318, filed Jun. 4, 2009.
U.S. Appl. No. 12/538,624, filed Aug. 10, 2009.
U.S. Appl. No. 12/731,895, filed Mar. 25, 2010.
International Search Report and Written Opinion from International Application No. PCT/US2007/009296, dated Oct. 17, 2007.
R. Ferrus et al., "Evaluation of a Cell Selection Framework for Radio Access Networks Considering Backhaul Resource Limitations," The 18th Annual IEEE International Symposium on Personal, Indoor and Mobile Radio Communications (PIMRC '07).
Emilio Mino et al., "IST-4-027756 WINNERII, D4.8.3, Integration of Cooperation on WINNER II System Concept," Information Society Technologies, Nov. 29, 2007.
Gregory Conklin et al., "Video Coding for Streaming Media Delivery on the Internet," IEEE Transactions on Circuits and Systems for Video Technology, vol. 11, No. 3, Mar. 2001.
Xin Liu et al., "Experiences in a 3G Network: Interplay between the Wireless Channel and Applications," MobiCom '08, Sep. 14-19, 2008.
Woon-Young Yeo et al., "Traffic Management of High-Speed CDMA Systems Base on Loan Prediction," IEICE Electronics Express, vol. 6, No. 7, pp. 389-394, published Apr. 10, 2009.
3rd Generation Partnership Project 2, "cdma2000 High Rate Packet Data Air Interface," 3GPP2 C.S0024-0, v. 4.0, (Oct. 2002).
3rd Generation Partnership Project 2, "cdma2000 High Rate Packet Data Air Interface," 3GPP2 C.S0024-A, v. 3.0, (Sep. 2006).
R. Droms, "Dynamic Host Configuration Protocol," Network Working Group, Request for Comments: 2131, Mar. 1997.
S. Alexander and R. Droms, "DHCP Options and BOOTP Vendor Extensions," Network Working Group, Request for Comments: 2132, Mar. 1997.
Non-Final Office Action for U.S. Appl. No. 12/956,178 mailed Jul. 30, 2012, 20 pages.
Final Office Action for U.S. Appl. No. 12/956,178 mailed Nov. 6, 2012, 19 pages.

* cited by examiner

DELIVERY OF WIRELESS ACCESS POINT INFORMATION

REFERENCE TO RELATED APPLICATION

This application is related to a co-pending application Ser. No. 12/956,178 entitled "Discovering a Frequency of a Wireless Access Point," filed on the same day as this application, the entirety of which is hereby incorporated by reference.

BACKGROUND

Wireless access points are becoming common in residential, business, and municipal settings. Wifi access points have been deployed in these types of locations for some time to provide packet data services. Meanwhile femtocell wireless access point ("femtocell") deployments, that provide cellular wireless telephony and/or packet data services, are growing rapidly. As the number of wireless communication devices (WCDs) that support both Wifi and cellular services proliferates, it may be beneficial to deploy both Wifi access points and femtocells in the same locations.

Particularly, some residential and business settings may not be well-served by macro-cellular wireless coverage areas. Thus, deploying co-located Wifi access points and femtocells may be advantageous for both wireless service providers and end users. Wireless service providers may benefit from off-loading traffic from their networks, while end users may benefit from having access to wireless voice and data services in places where macro-cellular wireless networks provide limited or no coverage.

OVERVIEW

Wifi access points and femtocells may be deployed in privately-controlled locations, such as a residence or a business. The entity that controls the location may also control whether a given WCD can utilize these wireless access points' wireless services. Thus, the Wifi access point may require that the given WCD is authorized for network access via the Wifi access point before granting network access to the given WCD. Similarly, the femtocell may require that the given WCD is authorized for network access via the femtocell before granting network access to the given WCD.

To that end, the Wifi access point may require that the given WCD is configured with one or more parameters that identify the Wifi access point and/or authorize the WCD to use the Wifi access point. Alternatively or additionally, the Wifi access point may maintain a whitelist that contains identifiers of WCDs that are permitted to use the Wifi access point. If a WCD with an identifier that is not in the whitelist attempts to use the Wifi access point, the WCD will be denied access even if the WCD is configured with valid authorization parameters. Similar techniques may be used to control whether the given WCD can use the femtocell.

When a Wifi access point and a femtocell are co-located (e.g., the respective wireless coverage areas defined by these devices are at least partially overlapping), the entity that controls these devices may want to allow a WCD that supports both Wifi and cellular services to be able to use both the Wifi access point and the femtocell. For instance, such a WCD may use the Wifi access point for data services and the femtocell for voice services. However, this may involve configuration of the WCD for both the Wifi access point and the femtocell, and configuration of whitelists on both of the Wifi access point and the femtocell. In order to reduce the amount of configuration entailed in such an arrangement, the Wifi access point may facilitate the WCD's access to the femtocell. Similarly, the femtocell may facilitate the WCD's access to the Wifi access point.

In particular, when a WCD accesses the Wifi access point, the Wifi access point may provide, to the WCD, information that identifies the femtocell and/or the femtocell's wireless coverage area. This information also may include authorization parameters that allow the WCD to access the femtocell. The Wifi access point may also provide the WCD's identifier to the femtocell for inclusion in the femtocell's whitelist. In this way, the WCD and the femtocell may be automatically configured so that the WCD can communicate via the femtocell.

Conversely, if the WCD accesses the femtocell, the femtocell may provide, to the WCD, information that identifies the Wifi access point and/or the Wifi access point's wireless coverage area. This information may also include authorization parameters that allow the WCD to access the Wifi access point. The femtocell may also provide the WCD's identifier to the Wifi access point for inclusion in the Wifi access point's whitelist. Thus, the WCD and the Wifi access point may be automatically configured so that the WCD can communicate via the Wifi access point.

Accordingly, in an example embodiment, a first wireless access point may define a first wireless coverage area. The first wireless access point may wirelessly receive a request from a WCD, and the request may include a WCD identifier that identifies the WCD. In response to the request, the first wireless access point may update a whitelist of a second wireless access point to include the WCD identifier. The first wireless access point may also transmit, to the WCD, a reply containing information that identifies a second wireless coverage area defined by the second wireless access point. Then the WCD may be able to access one or more networks via either the first wireless access point, the second wireless access point, or both.

In another example embodiment, a WCD may transmit, via a first wireless coverage area, a request to a first wireless access point that defines the first wireless coverage area. Via the first wireless coverage area, the WCD may receive information regarding a second wireless coverage area. Then, the WCD may use the information to access the second wireless coverage area and register for wireless service with a second wireless access point.

These and other aspects and advantages will become apparent to those of ordinary skill in the art by reading the following detailed description, with reference where appropriate to the accompanying drawings. Further, it should be understood that this overview and other description throughout this document is merely for purposes of example and is not intended to limit the scope of the invention as claimed.

DESCRIPTION

I. System Architecture

Figure 1:
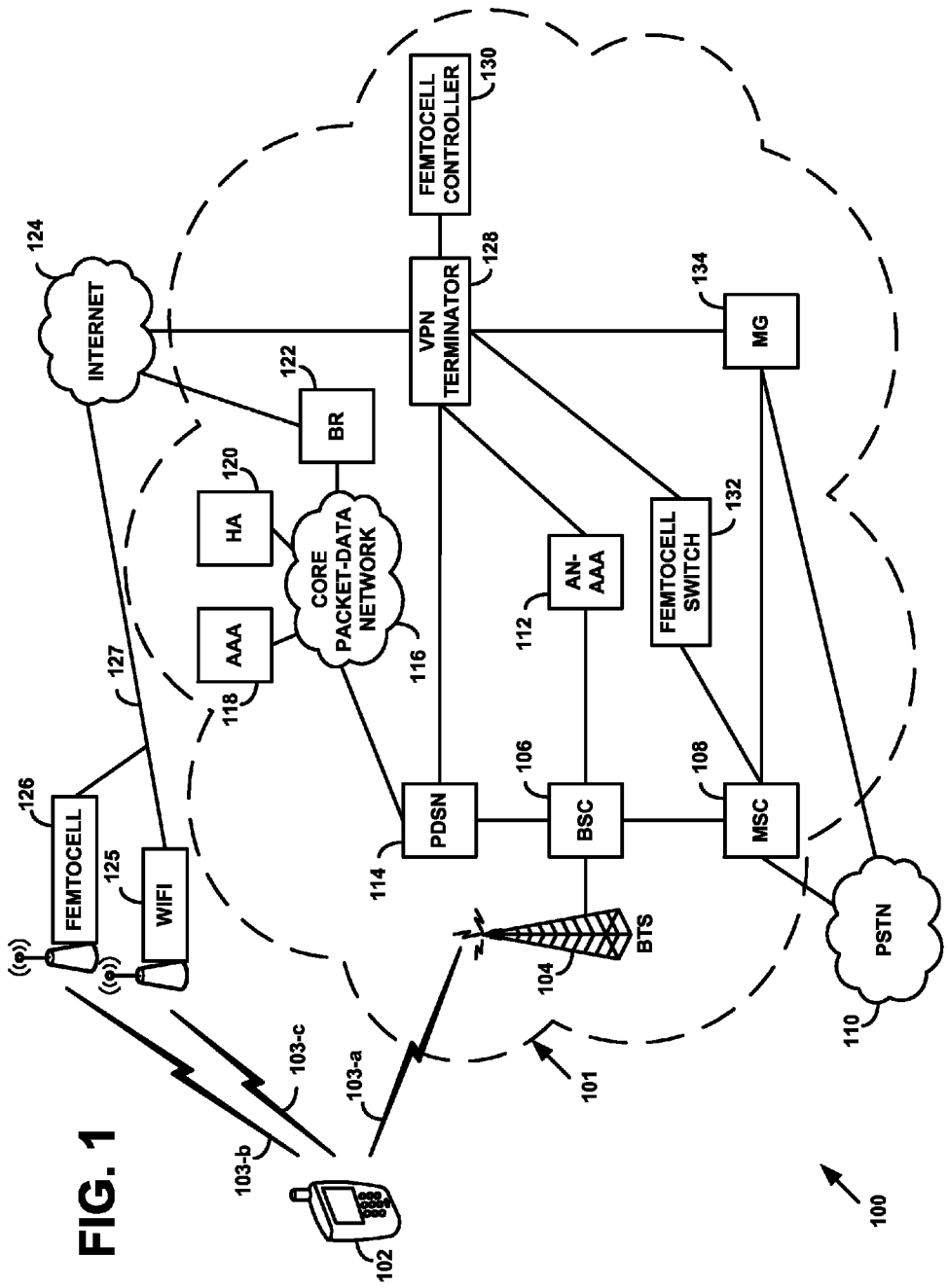
FIG. 1 depicts a network architecture, in accordance with an example embodiment.

FIG. 1 shows a block diagram of a communication network 100 that may be operated by a wireless service provider, and in which example embodiments can be deployed. Communication network 100 may operate according to various technologies including, but not limited to, Code-Division Multiple Access (CDMA), Worldwide Interoperability for Microwave Access (WIMAX®), Universal Mobile Telecommunications System (UMTS®), Long Term Evolution (LTE®), IDEN®, or Wifi. Thus, users may engage in communication via WCDs that support one or more of these or other technologies.

a. Wireless Air Interfaces

As shown, a WCD 102 may communicate with a macro-cellular radio access network (RAN) 101 over an air interface 103-*a*. In particular, air interface 103-*a* may be provided by BTS 104, which may be coupled or integrated with a BSC 106. WCD 102 is also shown as having an air interface 103-*b* with a femtocell 126 and an air interface 103-*c* with a Wifi access point 125. WCD 102 may use air interface 103-*b* for circuit voice and/or packet data services, while, and may use air interface 103-*c* for packet data services.

Transmissions over air interface 103-*a* from BTS 104 to WCD 102 may utilize a "forward link," while transmissions over interface 103-*a* from WCD 102 to BTS 104 may utilize a "reverse link." Similarly, transmissions over air interface 103-*b* from femtocell 126 to WCD 102 and transmissions over air interface 103-*c* from Wifi access point 125 to WCD 102 may utilize forward links, while transmissions over air interface 103-*b* from WCD 102 to femtocell 126 and transmissions over air interface 103-*c* from WCD 102 to Wifi access point 125 may utilize reverse links. Each forward link and each reverse link may comprise one or more traffic channels. Furthermore, the links of air interfaces 103-*a*, 103-*b*, and 103-*c* could be active concurrently or at different times, depending on the operational state of WCD 102, the physical location of WCD 102 with respect to BTS 104, Wifi access point 125, and femtocell 126, and the type of communication session that WCD 102 seeks or is engaged in.

Wifi access point 125 and femtocell 126 could be customer premises devices, deployed, for example, at a residence or business. Thus, both Wifi access point 125 and femtocell 126 may use broadband connection 127 (e.g., a cable modem, digital subscriber line (DSL), or T-carrier connection) to access Internet 124. While traffic passing through Wifi access point 125 may be routed by Internet 124 more or less directly to a correspondent node, at least some traffic passing through femtocell 126 may be routed to macro-cellular RAN 101 for further processing before being forwarded to correspondent nodes. This routing and further processing is discussed below in more detail.

b. Macro-Cellular RAN Architecture

With respect to macro-cellular RAN 101, BSC 106 may serve to control assignment of traffic channels (e.g., over air interface 103-*a*). BSC 106 may also be connected to a mobile switching center (MSC) 108, which in turn may provide access to wireless circuit-switched services such as circuit-voice and circuit-data. It should be understood that the term radio network controller (RNC) can also be used to refer to a BSC, or a combination BTS/BSC.

As represented by its connection to public-switched telephone network (PSTN) 110, MSC 108 may also be coupled with one or more other MSCs, other telephony circuit switches in the wireless service operator's (or in a different operator's) network, or other wireless communication systems. In this way, wireless communication network 100 may support user mobility across MSC regions, roaming between wireless service operators, and local and long-distance landline telephony services. Alternatively, part or all of MSC 108 may be replaced by softswitch components (not shown) that transport voice and other media over packet-switched networks, such as Internet Protocol (IP) networks.

BSC 106 may also be connected to an access network authentication, authorization, and accounting (AN-AAA) server 112. AN-AAA server 112 may support link-level authentication and authorization for WCD data sessions. Data transport may be provided by way of a communicative link between BSC 106 and a packet-data serving node (PDSN) 114, which in turn may provide connectivity with the wireless service provider's core packet-data network 116. Nodes that may reside within or adjunct to core packet-data network 116 are, by way of example, an authentication, authorization, and accounting (AAA) server 118, a mobile-IP home agent (HA) 120, and a border router (BR) 122.

PDSN 114 may be a router-like device that manages the connectivity of WCDs to a packet-switched network, such as the core packet-data network 116, the Internet 124, or one or more private IP networks (not shown). In an example embodiment, PDSN 114 may serve tens, hundreds or thousands of WCDs via point to point protocol (PPP) links to each of these WCDs. However, a PPP link to a WCD is not required for PDSN 114 to serve a WCD. PDSN 114 may also be capable of serving as a mobile-IP foreign agent.

HA 120 may serve as an anchor point for WCDs that use mobile-IP. While a WCD, such as WCD 102, may change its point of attachment from one foreign agent to another (e.g., from one PDSN to another) as it roams between wireless coverage areas, the WCD may maintain a registration with the same HA. Furthermore, in order to maintain a substantially static home IP address, the WCD may receive a home IP address assignment from an HA, and the HA may attempt to maintain this IP address assignment as the WCD moves between foreign agents.

AAA server 118 may provide network- and service-layer authentication and authorization support, and could be combined with AN-AAA server 112. Accordingly, AAA server 118 may support one or more protocols such as RADIUS and/or DIAMETER. AAA server 118 may maintain a profile for each WCD registered with the wireless service provider. Further, AAA server 118 may maintain profiles for other WCDs as well. Such a profile may contain an indication of the identity of each WCD and the WCD's subscriber (e.g., the WCD's user). For example, a profile for a given WCD may include the given WCD's network access identifier (NAI), mobile directory number (MDN), international mobile subscriber identifier (IMSI), electronic serial number (ESN), and/or mobile equipment identifier (MEID). Such a profile may also include a username, a password, and/or any other information associated with the given WCD. PDSN 114, HA 120, or both may authenticate WCD sessions and/or service requests from WCDs with AAA server 118.

BR 122 may seek to provide secure connectivity to the Internet 124. To that end, BR 122 could include a firewall, packet filter, and/or other security mechanisms. Thus, BR 122 may serve to protect core packet-data network 116, as well as macro-cellular RAN 101 in general, from potential attacks (e.g., hacking attempts, denial of service attacks, viruses, or malware) emanating from the Internet 124 or other IP networks.

Core packet-data network 116 could comprise one or more additional switches, routers, and gateways (not shown) that collectively provide transport and interconnection among the various entities and networks of macro-cellular RAN 101. In this context, for instance, core packet-data network 116 could be an overlay on, or a sub-network of, one or more additional networks.

Macro-cellular RAN 101 may also include a virtual private network (VPN) terminator 128. VPN terminator 128 may be a standalone component or combined with BR 122, HA 120, or other components of macro-cellular RAN 101. VPN terminator 128 may serve as an endpoint for secure connections with authorized devices seeking access to macro-cellular RAN 101 via unsecure, external networks such as the Internet 124. For instance, femtocell 126 may connect to Internet 124 over a broadband connection 127 to VPN terminator 128. Femtocell 126 could include a VPN client component that establishes a secure tunnel with VPN terminator 128, such that packet-data communications over the secure tunnel between femtocell 126 and VPN terminator 128 can then take place securely. Secure tunnels can be implemented according such protocols as IP Security (IPsec), although other mechanisms may be employed.

Assuming a secure VPN connection is established between femtocell 126 and VPN terminator 128, femtocell 126 may then communicate securely with other entities in macro-cellular RAN 101 by way of the VPN terminator 128. In particular, femtocell 126 may receive configuration and messaging data, and other operational parameters, from a femtocell controller 130. Femtocell controller 130 may also provide similar control and services for other femtocells connected to network macro-cellular RAN 101.

A femtocell switch 132 may act as a signaling gateway between MSC 108 and VPN terminator 128, enabling WCDs communicating via a femtocell, such as WCD 102 via femtocell 126, to engage in calls via MSC 108 to other wireless devices, as well as over PSTN 110. Media translation between packet-based media and circuit-based media may be carried out by a media gateway (MG) 134. Thus, femtocell 126 may transmit packetized data to MG 134 via VPN terminator 128. MG 134 may, in turn, translate or transcode the data to circuit-based media for transmission on PSTN 110, for example. MG 134 may perform the reverse translation for transmission in the opposite direction.

c. Femtocells

A femtocell may be considered to be a form of microcellular RAN. While femtocells may be deployed on user premises, femtocells can, in general, be deployed anywhere to provide wireless network coverage. Thus, wireless coverage areas defined by femtocells may overlap with wireless coverage areas from one or more macro-cellular RANs. WCDs may seek to register with either a femtocell or a macro-cellular RAN based on the respective signal strengths that the WCD receives from each of these devices, and/or based on other factors. For instance, if a WCD discovers the frequency of a femtocell, the WCD may be arranged to prefer using the femtocell over a macro-cellular RAN when both are available.

Furthermore, a femtocell typically has a small form factor, at least when compared to that of a macro-cellular RNC, so that the femtocell can be easily deployed in a particular location, or moved between locations. Thus, for instance, femtocells may be sold directly to consumers, in stores or online, and may be deployed by consumers in a residential or business network. To address the consumer and business markets, femtocells may also be low-cost, at least when compared to analogous macro-cellular devices.

As discussed above, a femtocell may be directly or indirectly coupled to a residential or business broadband network service, such as a cable modem, DSL, or T-carrier connection, so that the femtocell can communicate via the Internet. This use of wireline access to the Internet serves to offload traffic from macro-cellular RANs.

With respect to the various business entities involved in communication network 100, it is generally assumed throughout this specification that femtocell 126 is provided by, or at least associated with, the same wireless service provider that operates macro-cellular RAN 101. But, this need not be the case. Various business models may be in place through which other entities provide, manage, and/or support femtocell 126. Additionally, the individual who uses WCD 102 may be an account holder for both WCD 102 and femtocell 126 (i.e., the individual is a subscriber of the wireless service provider and his or her service plan includes WCD 102 and femtocell 126). But again, this need not be the case.

It should also be understood that the depiction of just one of each network component in FIG. 1 is illustrative, and there could be more than one of any component. Communication network 100 may also contain other types of components not shown. Alternatively or additionally, any network component in FIG. 1 could be omitted, or combined with another network component, without departing from the scope of the invention. Thus, the particular arrangement shown in FIG. 1 should not be viewed as limiting with respect to the present invention.

Further, the network components that make up a wireless communication system such as communication network 100 may be implemented as a combination of one or more integrated and/or distributed platforms, each comprising one or more computer processors, one or more forms of computer-readable storage (e.g., disks drives, random access memory, etc.), one or more communication interfaces for interconnection between components and the network and operable to transmit and receive the communications and messages described herein, and one or more computer software programs and related data (e.g., machine-language instructions and program and user data) stored in the one or more forms of computer-readable storage and executable by the one or more computer processors to carry out the functions, steps, and procedures of the various embodiments of the present invention described herein.

Figure 2:
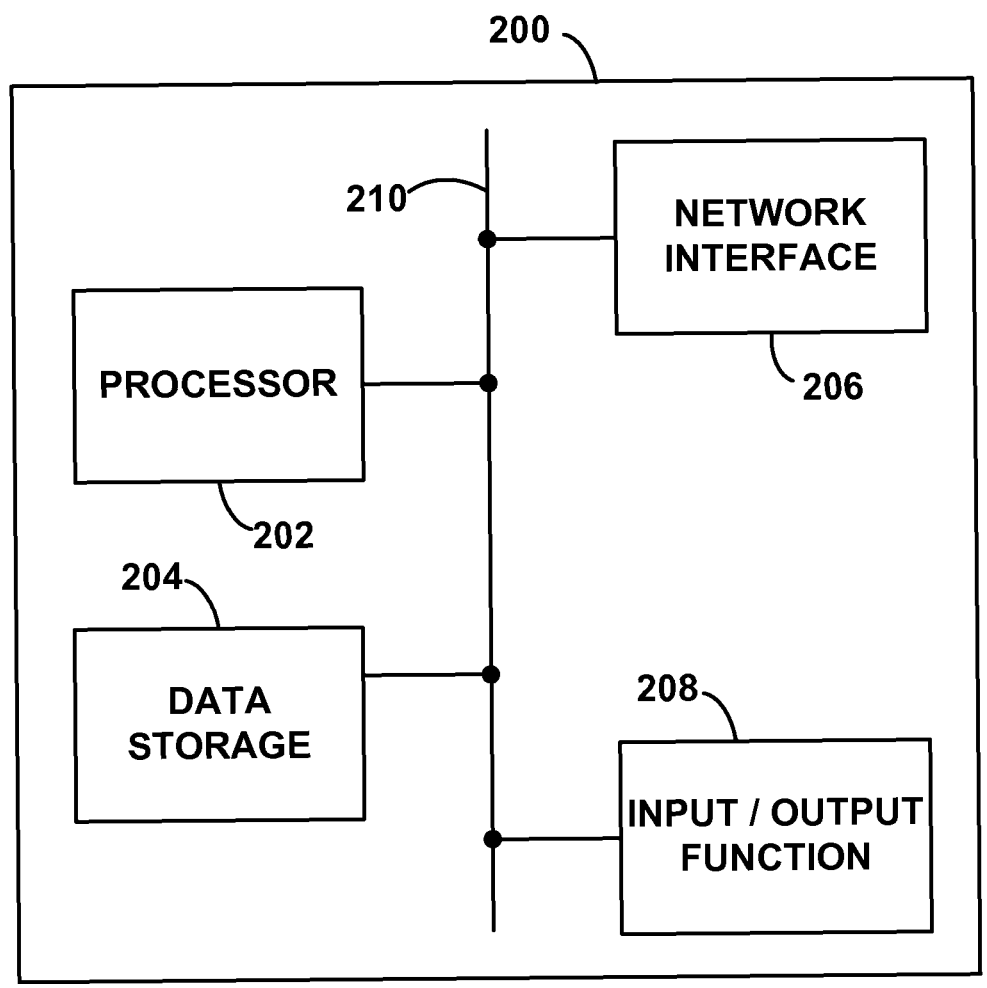
FIG. 2 is a block diagram of a wireless access point, in accordance with an example embodiment.

To that end, FIG. 2 is a simplified block diagram exemplifying a wireless access point 200 (e.g., Wifi access point 125 and/or femtocell 126) and illustrating some of the functional components that may be found in a wireless access point arranged to operate in accordance with the embodiments herein. FIG. 2 may also represent the components of other devices (e.g., clients, servers, routers, switches, and so on) discussed herein.

Wireless access point 200 preferably includes a processor 202, a data storage 204, a network interface 206, and an input/output function 208, all of which may be coupled by a system bus 210 or a similar mechanism. Processor 202 preferably includes one or more CPUs, such as one or more general purpose processors and/or one or more dedicated processors (e.g., application specific integrated circuits (ASICs) or digital signal processors (DSPs), etc.) Data storage 204, in turn, may comprise volatile and/or non-volatile data storage and can be integrated in whole or in part with processor 202.

Data storage 204 preferably holds program instructions executable by processor 202, and data that is manipulated by these instructions, to carry out the various methods, processes, or functions described herein. Alternatively, these methods, processes, or functions can be defined by hardware, firmware, and/or any combination of hardware, firmware and software. By way of example, the data in data storage 204 may contain program instructions executable by processor 202 to carry out any of the methods, processes, or functions disclosed in this specification or the accompanying drawings.

Network interface 206 may take the form of one or more wireless and/or wireline interfaces. For example, network interface 206 may comprise transceiver(s) that radiate to define one or more wireless coverage areas. These wireless coverage area may include air interfaces, such as air interfaces 103-b and/or 103-c, for engaging in communication with WCDs. Network interface 206 may also comprise a wireline interface, for example to a broadband connection, to communicate with the Internet or other IP networks. Network interface 206 may additionally comprise a wireless interface to communicate with other devices. Accordingly, network interface 206 may take the form of one or more wireless or wireline interfaces. However, other forms of physical layer connections and other types of standard or proprietary communication protocols may be used with network interface 206.

Input/output function 208 facilitates user interaction with wireless access point 200. Input/output function 208 may comprise multiple types of input devices, such as a keyboard, a mouse, a touch screen, and so on. Similarly, input/output function 208 may comprise multiple types of output devices, such as a monitor, printer, or one or more light emitting diodes (LEDs). Additionally or alternatively, wireless access point 200 may support remote access from another device, via network interface 206 or via another interface (not shown), such an RS-232 or universal serial bus (USB) port.

II. Customer Premises RAN

Figure 3:
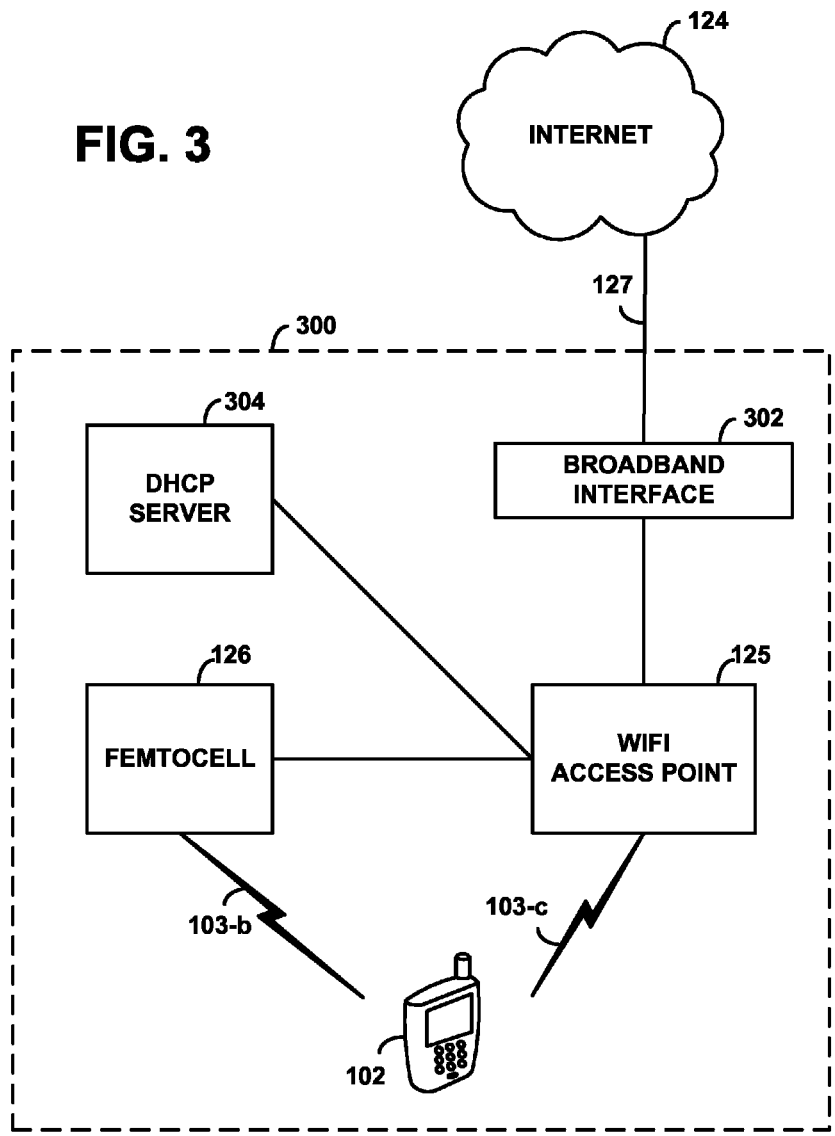
FIG. 3 depicts a RAN including a co-located femtocell and Wifi access point, in accordance with an example embodiment.

Both Wifi access points and femtocells may be communicatively coupled in a network that will be referred to as a "customer premises RAN." FIG. 3 depicts an example of a customer premises RAN 300, that includes Wifi access point 125, femtocell 126, as well as other devices and connections.

In FIG. 3, Wifi access point 125 may define a Wifi wireless coverage area that enables air interface 103-c, while femtocell 126 may define a cellular wireless coverage area that enables air interface 103-b. As discussed above, WCD 102 may use air interface 103-b to communicate with femtocell 126 and air interface 103-c to communicate with Wifi access point 125. In some embodiments, communications over air interface 103-c may conform, to at least some extent, with 802.11 technology. Similarly, communications over air interface 103-b may conform, to at least some extent, with one or more of CDMA, WIMAX®, UMTS®, LTE®, or IDEN® technologies. Thus, either air interface may be based on technologies that are now known or developed in the future. Wifi access point 125 and femtocell 126 may use different operating frequencies to define their respective wireless coverage areas.

Customer premises RAN 300 may also include Dynamic Host Configuration Protocol (DHCP) server 304 and broadband interface 302. DHCP server 304 may communicate with Wifi access point 125 and femtocell 126 via a local area network, or may be combined with either of these devices. In an example embodiment, DHCP server 304 is a configuration server that is used to assign addresses to WCDs using RAN 300, and/or pass configuration information between the various devices in RAN 300 (including WCD 102). Broadband interface 302 may be a broadband modem, such as a cable modem, DSL modem, or T-carrier line card, which allows Wifi access point 125, femtocell 126, and DHCP server 304 to communicate with the Internet 124 and other networks via broadband connection 127.

It should be understood that while DHCP is typically used to assign addresses to client devices, DHCP may also assign addresses to other types of devices. Further, DHCP is a flexible, extensible protocol that can be used to transport additional configuration information, or other types of information, between network devices. Thus, devices such as femtocell 126 may use DHCP to obtain and maintain an IP address. Further, any device in customer premises RAN 300 may partake in various types of transactions with DHCP server 304 to communicate additional information to or from DHCP server 304.

Figure 4:
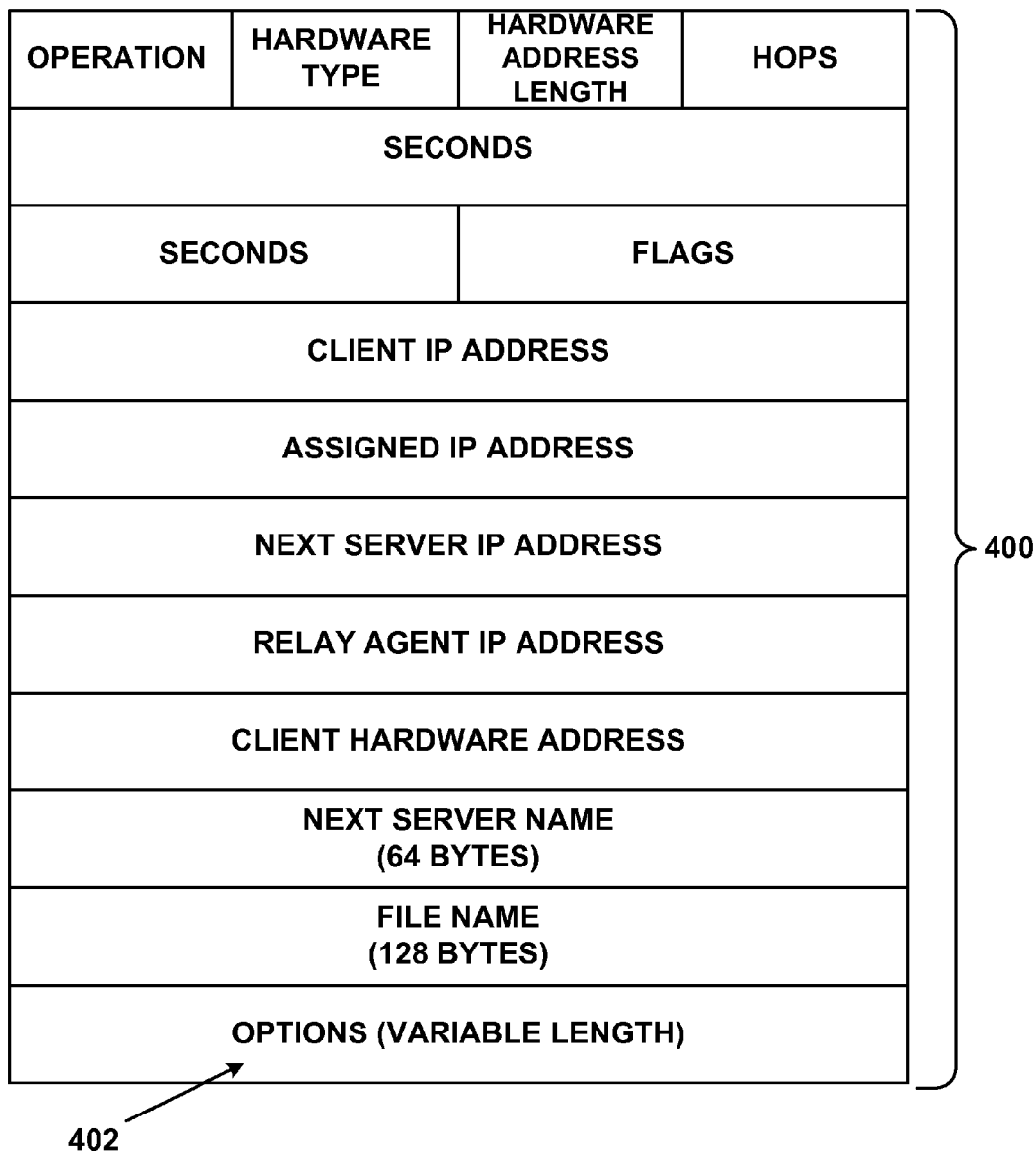
FIG. 4 is an example packet format, in accordance with an example embodiment.

FIG. 4 depicts an example DHCP header 400. Typically, such a DHCP header is placed within a User Datagram Protocol (UDP) header, which in turn is placed within an IP packet. The various fields of DHCP header 400 are described in detail in Internet Request for Comments (RFC) 2131, entitled "Dynamic Host Configuration Protocol." Accordingly, RFC 2131 is incorporated herein in its entirety.

An example DHCP transaction between a device seeking an address assignment, which shall be referred to as a "DHCP client," and a DHCP server may proceed as follows. The DHCP client may transmit a DHCPDISCOVER message to the DHCP server. This transmission may occur in response to the DHCP client booting, initializing a network interface, or for some other reason. The DHCP server may respond by transmitting a DHCPOFFER message containing a provisionally-assigned address to the DHCP client. Then, if the DHCP client determines to accept this offer, the DHCP client may transmit a DHCPREQUEST message to the DHCP server, indicating that the offer was accepted. The DHCP server may respond to the DHCPREQUEST message by transmitting a DHCPACK message to the DHCP client, thereby confirming the address assignment. Once this process concludes, the DHCP client may use the assigned address to communicate with other networked devices.

As stated above, in some DHCP transactions, additional information is passed between the DHCP client and the DHCP server. For instance, in the DHCPOFFER and/or DHCPACK messages, the DHCP server may also assign an IP network mask (netmask) to the DHCP client, and also inform the DHCP client of the address of a local router, as well as the address of one or more Domain Name System (DNS) servers. Further, the DHCP server may provide a lease time for the address assignment, after which the address assignment expires.

Once an assignment is made via DHCP, the DHCP client may request renewal of the lease time by transmitting a DHCPREQUEST message to the DHCP server. If the DHCP server grants the renewal, the DHCP server may do so by transmitting a DHCPACK message to the DHCP client. Also, the DHCP client device may request additional configuration information by transmitting a DHCPINFORM message to the DHCP server, and the DHCP server may provide the requested information to the DHCP client in a DHCPACK message.

In order to provide a mechanism for passing various types of information between the DHCP client and the DHCP server, DHCP allows for DHCP messages to include one or more options. These options may be placed in options field 402, and may encode the information using a type-lengthvalue (TLV) format. Some options commonly used with DHCP are described in detail in Internet Request for Comments (RFC) 2132, entitled "DHCP Options and BOOTP Vendor Extensions." Accordingly, RFC 2132 is incorporated herein in its entirety.

DHCP options may include standard options, such as those listed in RFC 2132 and other documents, as well as vendor-specific options. As defined in RFC 2132, vendor-specific options are defined by particular companies, entities, or organizations in order to add functionality to DHCP without having this functionality approved by a standards organization. Usually, DHCP client and servers will only process DHCP options that they explicitly support. If a DHCP client or server receives a DHCP message containing an unsupported option, the DHCP client or server may silently ignore the option, but continue processing the rest of the DHCP packet. For purposes of simplicity, hereinafter the term "DHCP option" may refer to either a standard DHCP option or a vendor-specific DHCP option.

III. Automatically Configuring a WCD and a Wireless Access Point

In a RAN, such as customer premises RAN 300, a femtocell and a Wifi access point may both be deployed. These devices may each radiate to define respective wireless coverage areas on different frequencies. In at least some RANs, the respective wireless coverage areas may substantially overlap. Thus, a WCD with both Wifi and cellular capabilities (a "dual-mode" WCD) may be able to use either or both of the femtocell and Wifi access point to gain access to the Internet and/or other networks.

In this scenario, the same entity may control both wireless access points. This controlling entity may want to allow the WCD to use both the Wifi access point and the femtocell. For example, in a residential RAN, the WCD may be used by a family member, friend, or guest of the controlling entity. Similarly, in a corporate RAN, the WCD may be used by an employee, partner, contractor, or visitor of the controlling entity. If the controlling entity permits the WCD to use of one of the wireless access points, the controlling entity is likely to approve the WCD's use of the other wireless access point as well.

Thus, it may be advantageous to allow a WCD that is configured and authorized to use one of the wireless access points to automatically gain access to the other wireless access point. More particularly, if the WCD is configured and authorized to use the Wifi access point, the customer premises RAN may allow the WCD to use the femtocell. Likewise, if the WCD is configured and authorized to use the femtocell, the customer premises RAN may allow the WCD to use the Wifi access point.

Particularly, when the WCD accesses a first co-located wireless access point, the customer premises RAN may automatically provide information (e.g., configuration parameters and/or authorization parameters) to the WCD and to a second co-located wireless access point. The WCD and the second wireless access point may then use this information so that the WCD can communicate via the second co-located wireless access point.

a. Wifi Access Point and Femtocell Configuration Parameters

In some embodiments, a Wifi access point may use a service set identifier (SSID) to specify its wireless coverage area. Such an SSID may take the form of a 32-character string. In the presence of multiple Wifi access points, a WCD can use a particular SSID to identify and access a particular Wifi access point.

Further, the Wifi access point may require that the WCD is configured with a pre-shared key, and/or a userid/password pair. In the case of a pre-shared key, the WCD and the Wifi access point may encrypt their communications to one another with the pre-shared key. In the case of a userid/password pair, the WCD may be configured with a userid and password with which to access the Wifi access point. The Wifi access point may directly authorize the WCD to use the Wifi access point based on the userid and password, or the Wifi access point may provide the user and password to an AAA server, and the AAA server may inform the Wifi access point whether the WCD has been authorized.

Alternatively or additionally, the Wifi access point may maintain a whitelist that contains identifiers of WCDs that are permitted to use the Wifi access point. If a WCD with an identifier that is not in the whitelist attempts to use the Wifi access point, the WCD may be denied access even if the WCD is configured with a valid pre-shared key and/or userid/password pair.

Similar techniques (i.e., pre-shared keys, userid/password pairs, and/or whitelists) may control whether the WCD can use the femtocell. Moreover, either or both of the Wifi access point and the femtocell may be configured with additional parameters not described herein. These additional parameters may include indications of one or more frequencies, channels, time slots, and/or any other type of information used to operate, identify, or secure a wireless network.

b. Example Message Flows

Figure 5:
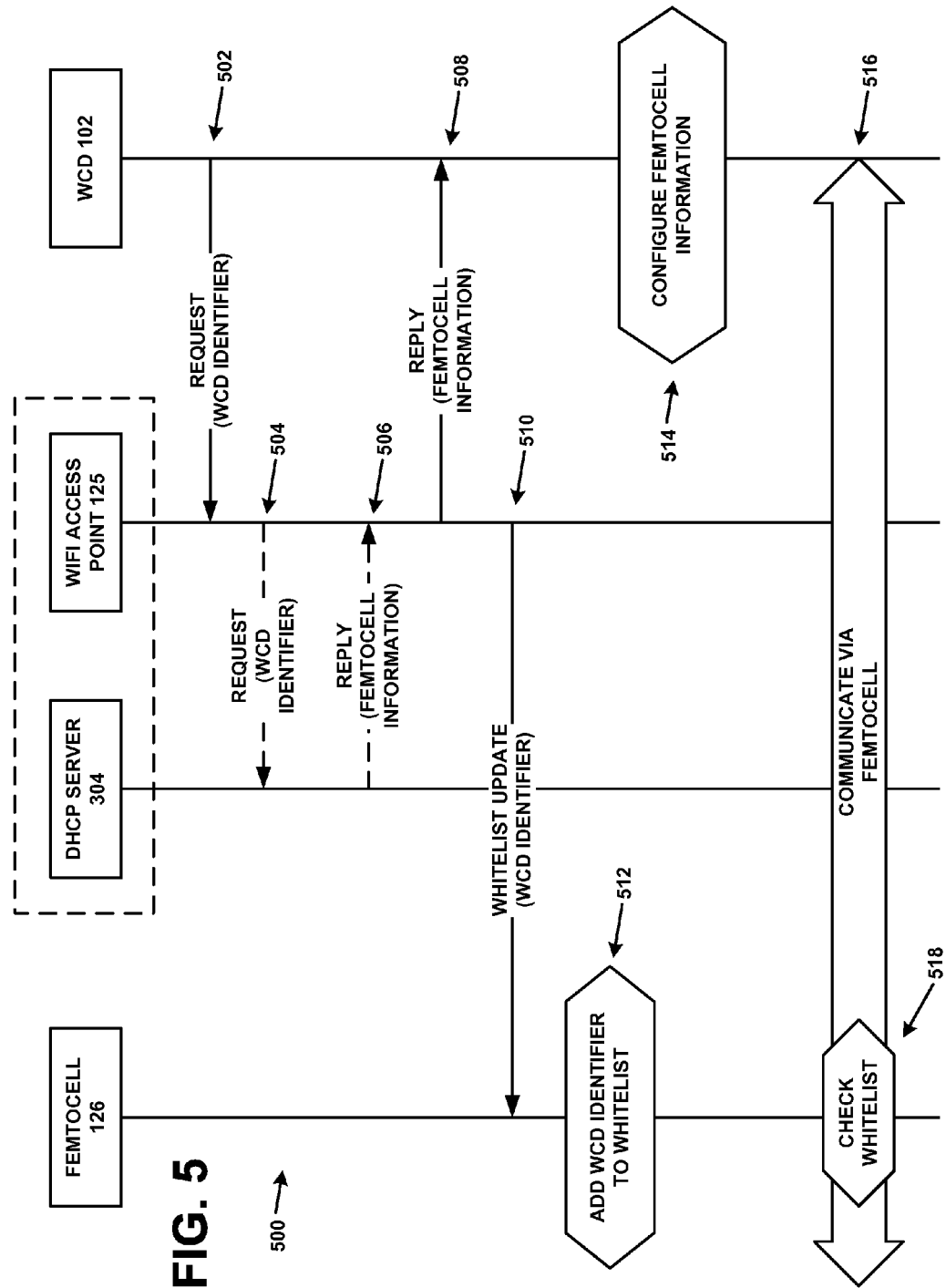
FIG. 5 is a first message flow, in accordance with an example embodiment.

FIG. 5 is a message flow 500 illustrating an example embodiment. Message flow 500 involves communications between WCD 102, Wifi access point 125, femtocell 126, and DHCP server 304. As denoted by the dashed line surrounding Wifi access point 125 and DHCP server 304, these elements may be combined into the same physical device. Alternatively, DHCP server 304 could reside on a separate physical device or could be combined with femtocell 126. WCD 102 and Wifi access point 125 may be configured so that WCD 102 can communicate via Wifi access point 125.

At steps 502 and 504, WCD 102 may transmit a request message to DHCP server 304 via Wifi access point 125. This request message may include an identifier of WCD 102, such as a medium-access control (MAC) address, NAI, MDN, IMSI, ESN, MEID, or any other form of WCD identifier. The request message may take the form of, for example, a DHCP-DISCOVER, DHCPREQUEST, or DHCPINFORM message that WCD 102 transmits to acquire an IP address and/or other information from DHCP server 304. For example, WCD 102 may transmit this request message in response to registering with Wifi access point 125 for wireless service. Thus, the WCD identifier may be encoded in a DHCP option.

At steps 506 and 508, in response to receiving the request message, DHCP server 304 may transmit a reply message to WCD 102 via Wifi access point 125. This reply message may, for example, take the form of a DHCPOFFER or DHCPACK message, and may provide the information associated with femtocell 126 to WCD 102. This information may be encoded in a DHCP option, and may include any type of information that can be used to identify femtocell 126, or allow WCD 102 to be authorized by femtocell 126. Thus, the information may include one or more frequencies, channels, pre-shared keys, userids, passwords, and/or any other type of information used to operate, identify, or secure femtocell 126.

As denoted by the dashed lines, when DHCP server 304 and Wifi access point 125 operate within the same physical device, steps 504 and 506 may be omitted. Further, the DHCP protocol is not the only mechanism with which steps 502, 504, 506, and 508 can be performed.

At step 510, Wifi access point 125 may transmit a whitelist update message, including the WCD identifier, to femtocell 126. Then, at step 512, femtocell 126 may add the WCD identifier to its whitelist. In this way, femtocell 126 can be automatically configured to permit WCD 102 to use femtocell 126 for communication.

At step 514, WCD 102 may configure itself according to the information received at step 508 so that WCD 102 can access femtocell 126. For example, if the information contains a frequency, WCD 102 may tune a cellular transceiver to this frequency. Similarly, if the information contains a pre-shared key, WCD 102 may use this pre-shared key to communicate with femtocell 126.

Regardless, at step 516, WCD 102 may register for service with femtocell 126 and communicate with correspondent nodes via femtocell 126. Once registered with both Wifi access point 125 and femtocell 126, WCD 102 may communicate in a substantially simultaneous fashion via both Wifi access point 125 and femtocell 126. For instance, WCD 102 may use Wifi access point 125 for data communication and femtocell 126 for voice communication.

For any communication involving WCD 102, femtocell 126 may, at step 518, check its whitelist to determine whether to allow the communication to take place. For example, WCD 102 may transmit a packet to a correspondent node via femtocell 126. Femtocell 126 may examine the MAC address contained in this packet (i.e., the MAC address of WCD 102), and may determine that this MAC address is in the whitelist. Accordingly, femtocell 126 may forward the packet on toward to the correspondent node.

Message flow 500 allows a dual-mode WCD to advantageously discover and use a femtocell that is located near, or co-located with, a Wifi access point. As a result, the WCD may take advantage of the femtocell's services without either the WCD or femtocell being manually configured to communicate with one other.

Additionally, message flow 500 is backward compatible with WCDs that are not configured to understand the DHCP option in which the information appears. The preferred behavior of a DHCP client that receives a DHCP option that it doesn't support is to ignore this DHCP option. Thus, these WCDs may ignore the DHCP option without being negatively impacted by the mechanisms described herein.

Figure 6:
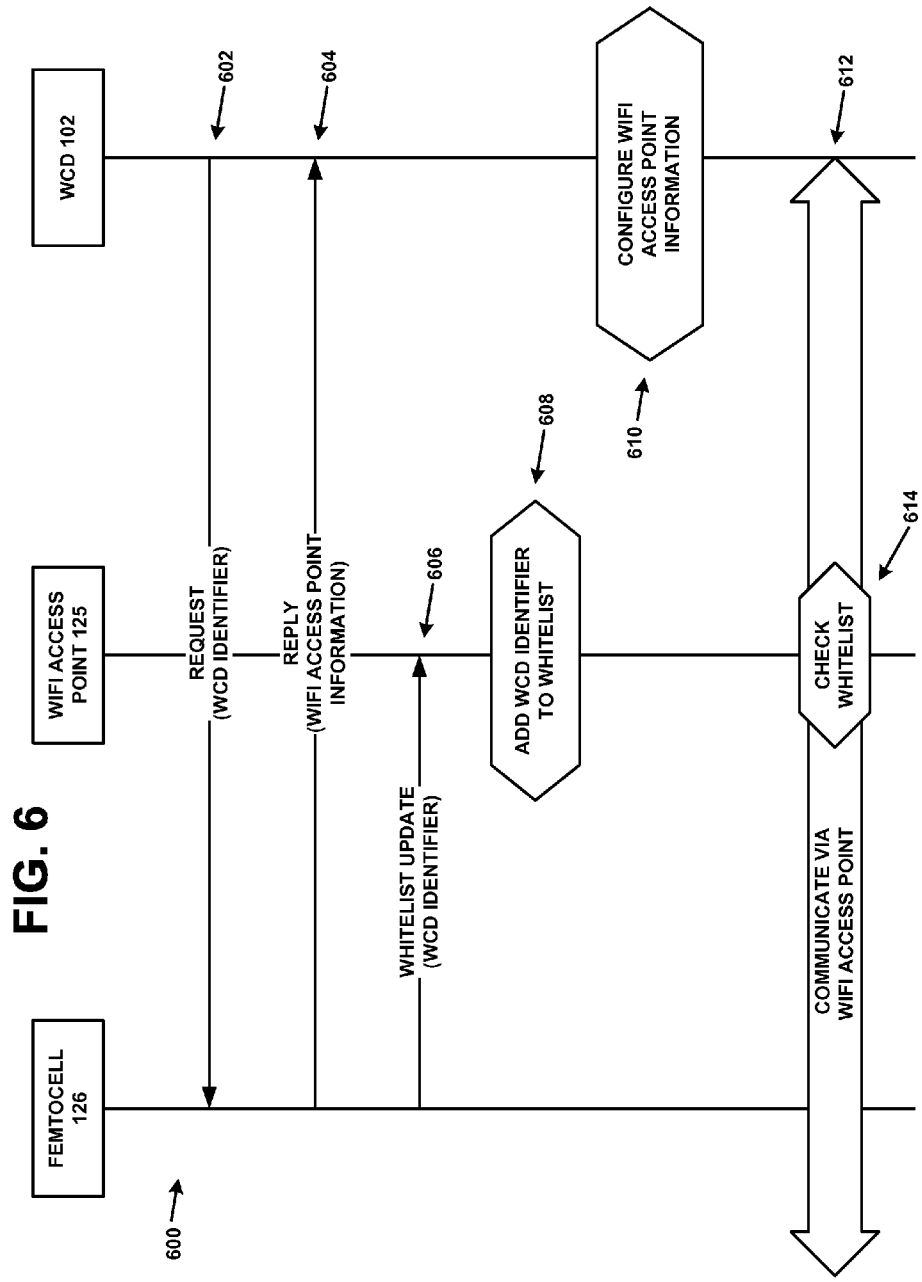
FIG. 6 is a second message flow, in accordance with an example embodiment.

FIG. 6 is a message flow 600 that illustrates how a femtocell that is co-located with a Wifi access point can facilitate the configuration of a WCD and the Wifi access point so that the WCD can communicate via the Wifi access point. At step 602, WCD 102 may transmit a request message to femtocell 126. This request message may include an identifier of WCD 102, such as a MAC address, NAI, MDN, IMSI, ESN, MEID, or any other form of WCD identifier. The request message may take the form of, for example, a DHCP message, and the WCD identifier may be encoded in a DHCP option. Alternatively, the request message may take the form of a short message service (SMS) message.

At step 604, in response to receiving the request message, femtocell 126 may transmit a reply message to WCD 102. The reply message may contain information regarding Wifi access point 125 and/or at least one wireless coverage area defined by Wifi access point 125. The reply message may take the form of, for example, a DHCP message, and the WCD identifier may be encoded in a DHCP option. Alternatively, the reply message may take the form of a short message service (SMS) message.

At step 606, also in response to receiving the request, femtocell 126 may transmit a whitelist update message to Wifi access point 125. Then, at step 608, Wifi access point 125 may add the WCD identifier to its whitelist. In this way, Wifi access point 125 can be automatically configured to permit WCD 102 to use Wifi access point 125 for communication.

At step 610, WCD 102 may configure itself according to the information contained in the reply message so that WCD 102 can access Wifi access point 125. For example, if the information contains an SSID, WCD 102 may identify a wireless coverage area defined by Wifi access point 125 based on this SSID. Similarly, if the information contains a pre-shared key, WCD 102 may use this pre-shared key to communicate with Wifi access point 125.

Regardless, at step 612, WCD 102 may register for service with Wifi access point 125 and communicate with correspondent nodes via Wifi access point 125. Once registered with both Wifi access point 125 and femtocell 126, WCD 102 may communicate simultaneously via both Wifi access point 125 and femtocell 126. For instance, WCD 102 may use Wifi access point 125 for data communication and femtocell 126 for voice communication.

For any communication involving WCD 102, Wifi access point 125 may, at step 614, check its whitelist to determine whether to allow the communication to take place. For example, WCD 102 may transmit a packet to a correspondent node via Wifi access point 125. Wifi access point 125 may examine the MAC address contained in this packet (i.e., the MAC address of WCD 102), and may determine that this MAC address is in the whitelist. Accordingly, Wifi access point 125 may forward the packet on toward to the correspondent node.

It should be understood that message flows 500 and 600 are presented for purposes of example. Thus, these message flows may contain more or fewer steps, and any steps of these message flows may be repeated and/or performed in a different order. Additionally, message flows 500 and 600 may be combined, in whole or in part, without departing from the scope of the invention.

Figure 7:
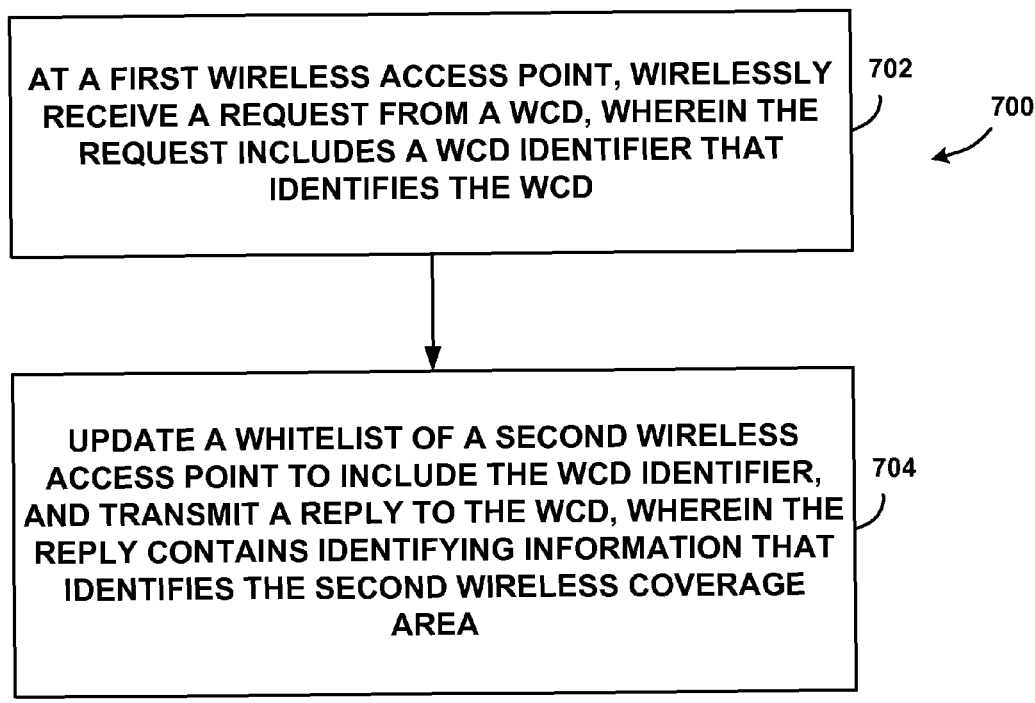
FIG. 7 is a first flow chart, in accordance with an example embodiment.
Figure 8:
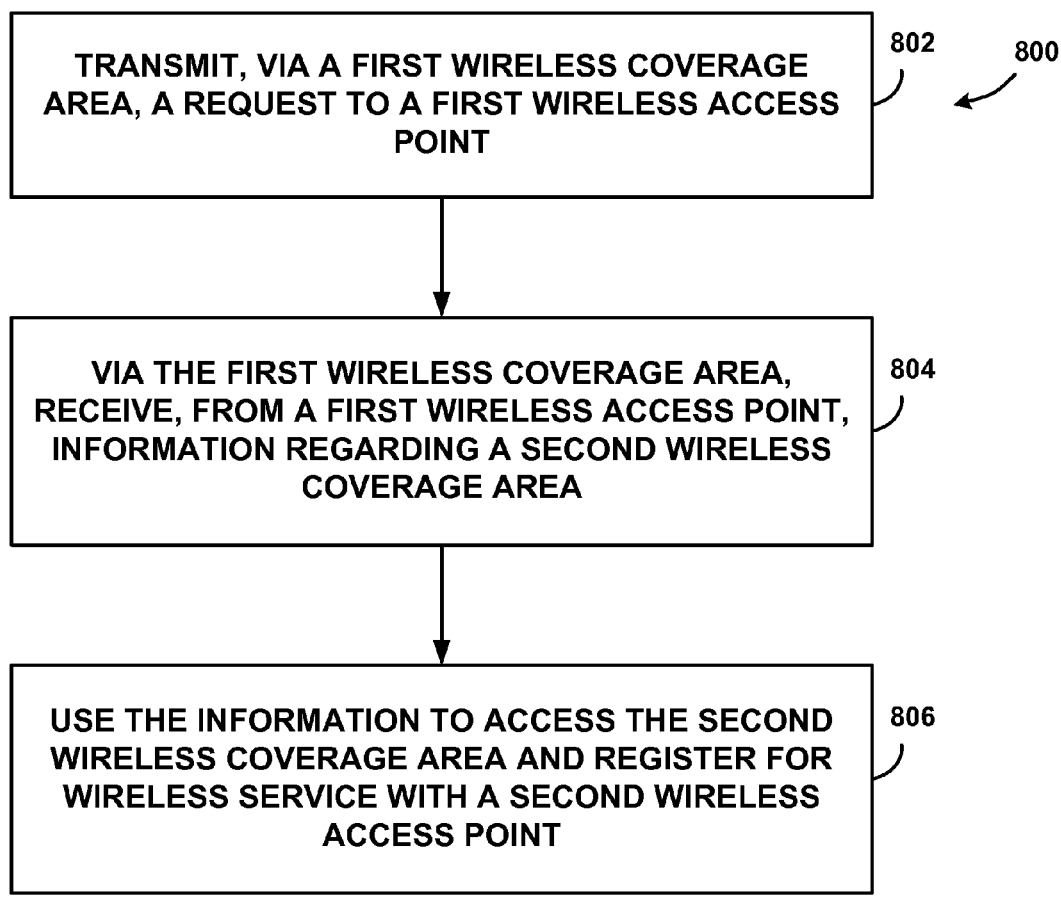
FIG. 8 is a second flow chart, in accordance with an example embodiment.

FIGS. 7 and 8 are flow charts illustrating methods 700 and 800, respectively. These methods may be used to automatically configure a WCD and a wireless access point so that the WCD can communicate via the wireless access point. Like message flows 500 and 600, these methods are presented for purposes of example, and should be construed as non-limiting embodiments.

For flow chart 700, a RAN may radiate to define a first wireless coverage area and a second wireless coverage area. The first and second wireless coverage areas may substantially overlap with one another, and each of the first and second wireless coverage areas may be formed using a different wireless technology. For example, the RAN may contain a first wireless access point that radiates to define the first wireless coverage area, and a second wireless access point that radiates to define the second wireless coverage area. In some possible embodiments, the first wireless access point may be a Wifi access point and the second wireless access point may be a femtocell. In other embodiments, the first wireless access point may be a femtocell and the second wireless access point may be a Wifi access point.

At step 702, the first wireless access point may wirelessly receive a request message from a WCD. The request message may include a WCD identifier that identifies the WCD, such as a MAC address, NAI, MDN, IMSI, ESN, MEID, or any other form of WCD identifier. The request message may take various forms, such as that of a DHCP message or an SMS message. If the request message takes the form of a DHCP message, the WCD identifier may be encoded in a DHCP option.

At step 704, in response to receiving the request message, the first wireless access point may update a whitelist of devices permitted to use the second wireless access point to include the WCD identifier. For instance, the first wireless access point may transmit the WCD identifier to the second wireless access point, and the second wireless access point may revise the whitelist to include the WCD identifier.

Also in response to receiving the request message, the first wireless access point may transmit a reply message to the WCD. The reply message may contain identifying information that identifies the second wireless coverage area and/or the second wireless access point. This identifying information may include one or more of an SSID, a userid, a password, a frequency, a channel, or any other information that may identify the second wireless coverage area and/or the second wireless access point. The reply message may also take the form of a DHCP message or an SMS message. If the reply message takes the form of a DHCP message, the identifying information may be encoded in one or more DHCP options.

Alternatively, transmitting the reply message to the WCD may involve the second wireless access point transmitting the identifying information to the first wireless access point, and the first wireless access point transmitting the reply message to the WCD. For example, either in response to a request message, or from time to time, the second wireless access point may transmit the identifying information. This transmission may be directed to a specific WCD, or to the first wireless access point so that the first wireless access point can transmit the identifying information to a specific WCD. Alternatively, the transmission may be directed to one or more WCDs via broadcast or multicast mechanisms.

For flow chart 800, a first wireless access point may radiate to define a first wireless coverage area, and a second wireless access point may radiate to define a second wireless coverage area. The first and second wireless coverage areas may substantially overlap with one another, and each of the first and second wireless coverage areas may be formed using a different wireless technology. In some possible embodiments, the first wireless access point may be a Wifi access point and the second wireless access point may be a femtocell. In other embodiments, the first wireless access point may be a femtocell and the second wireless access point may be a Wifi access point.

At step 802, a WCD may transmit, via the first wireless coverage area, a request message to the first wireless access point. At step 804, the WCD may receive, from the first wireless access point and via the first wireless coverage area, information regarding the second wireless coverage area. Then, at step 806, the WCD may use the information to access the second wireless coverage area and register for wireless service with the second wireless access point.

The request message may include a WCD identifier that identifies the WCD, such as a MAC address, NAI, MDN, IMSI, ESN, MEID, or any other form of WCD identifier. The request message may take various forms, such as that of a DHCP message or an SMS message. If the request message takes the form of a DHCP message, the WCD identifier may be encoded in a DHCP option.

The reply message may contain identifying information that identifies the second wireless coverage area and/or the second wireless access point. This identifying information may include one or more of an SSID, a userid, a password, a frequency, a channel, or any other information that may identify the second wireless coverage area and/or the second wireless access point. The reply message may also take the form of a DHCP message or an SMS message. If the reply message takes the form of a DHCP message, the identifying information may be encoded in one or more DHCP options.

IV. Conclusion

Example embodiments have been described above. Those skilled in the art will understand, however, that changes and modifications may be made to these embodiments without departing from the true scope and spirit of the invention, which is defined by the claims.

What is claimed is:

1. A method comprising:
a first wireless access point wirelessly receiving a request from a wireless communication device (WCD), wherein the first wireless access point comprises a femtocell access point and defines a first wireless coverage area, wherein the request includes a WCD identifier that identifies the WCD, and wherein the WCD identifier comprises a media access control (MAC) address; and
in response to the request, the first wireless access point (i) transmitting, to a second wireless access point, a whitelist of devices permitted to use the second wireless access point, wherein the whitelist of devices includes the WCD identifier, wherein the second wireless access point comprises a Wifi access point and defines a second wireless coverage area, and (ii) transmitting a reply to the WCD, wherein the reply contains identifying information that identifies the second wireless coverage area, wherein the whitelist is maintained by the second wireless access point, and wherein transmitting the whitelist comprises:
the first wireless access point transmitting the WCD identifier to the second wireless access point; and
the second wireless access point revising the whitelist to include the WCD identifier.

2. The method of claim 1, wherein the first and second wireless coverage areas are substantially overlapping, and wherein the first and second wireless coverage areas are defined using different wireless access technologies.

3. The method of claim 1, wherein the identifying information includes at least one of a service set identifier (SSID), a password, and a channel.

4. The method of claim 1, wherein the reply comprises a short-message-service (SMS) message.

5. A system comprising:
a first wireless access point configured to define a first wireless coverage area, and including a processor and a data storage, wherein the first wireless access point comprises a femtocell access point;
a second wireless access point configured to define a second wireless coverage area, wherein each of first and second wireless coverage areas is formed using a different wireless access technology, wherein the second wireless access point comprises a Wifi access point; and
program instructions, stored in the data storage and executable by the processor to (i) wirelessly receive a request from a wireless communication device (WCD), wherein the request includes a WCD identifier that identifies the WCD, and (ii) in response to the request, transmit, to the second wireless access point, a whitelist of devices permitted to use the second wireless coverage area, wherein the whitelist of devices includes the WCD identifier, and transmit a reply to the WCD, wherein the reply contains identifying information that identifies the second wireless coverage area, wherein the WCD identifier comprises a media access control (MAC) address, wherein the whitelist is maintained by the second wireless access point, and wherein the program instructions to transmit the whitelist comprise program instructions for the first wireless access point to transmit the WCD identifier to the second wireless access point, causing the second wireless access point to revise the whitelist to include the WCD identifier.

6. The system of claim 5, wherein the identifying information includes at least one of a service set identifier (SSID), a password, and a channel.

7. The system of claim 5, wherein the first and second wireless coverage areas are substantially overlapping, and wherein the first and second wireless coverage areas are defined using different wireless access technologies.

8. The system of claim 5, wherein the reply comprises a short-message-service (SMS) message.

9. A method comprising:
a first wireless access point wirelessly receiving a request from a wireless communication device (WCD), wherein the first wireless access point comprises a Wifi access point and defines a first wireless coverage area, and wherein the request includes a WCD identifier that identifies the WCD, wherein the WCD identifier comprises a mobile directory number (MDN) or a mobile equipment identifier (MEID); and
in response to the request, the first wireless access point (i) transmitting, to a second wireless access point, a whitelist of devices permitted to use the second wireless access point, wherein the whitelist of devices includes the WCD identifier, wherein the second wireless access point comprises a femtocell access point and defines a second wireless coverage area, and (ii) transmitting a reply to the WCD, wherein the reply contains identifying information that identifies the second wireless coverage area, and wherein the whitelist is maintained by the second wireless access point, and wherein transmitting the whitelist comprises:
the first wireless access point transmitting the WCD identifier to the second wireless access point; and
the second wireless access point revising the whitelist to include the WCD identifier.

10. The method of claim 9, wherein the identifying information contains a frequency or a channel.

11. The method of claim 9, wherein the reply comprises a Dynamic Host Configuration Protocol (DHCP) reply, and wherein the identifying information is contained within a DHCP option.

12. The method of claim 9, wherein transmitting the reply to the WCD further comprises:
the second wireless access point transmitting the identifying information to the first wireless access point; and
the first wireless access point transmitting the reply to the WCD.

13. The method of claim 9, wherein the first and second wireless coverage areas are substantially overlapping, and wherein the first and second wireless coverage areas are defined using different wireless access technologies.

* * * * *